United States Patent [19]

Donlon

[11] 4,337,051
[45] Jun. 29, 1982

[54] SELF-SCORING TEST WITH NON-DISCLOSED KEY

[76] Inventor: Thomas Donlon, 113 King George Rd., Pennington, N.J. 08534

[21] Appl. No.: 196,833

[22] Filed: Oct. 14, 1980

[51] Int. Cl.³ .............................................. G09B 3/00
[52] U.S. Cl. .................................... 434/328; 434/346
[58] Field of Search ............... 434/327, 328, 346, 353, 434/363

[56] References Cited

U.S. PATENT DOCUMENTS

| | | | |
|---|---|---|---|
| 1,644,160 | 10/1927 | Thompson | 434/363 X |
| 1,883,775 | 10/1932 | Finkenbinder | 434/353 X |
| 2,614,338 | 10/1952 | Clark | 434/363 |
| 2,986,820 | 6/1961 | Neville et al. | 434/346 |
| 3,451,143 | 6/1969 | Thomas et al. | 434/328 |
| 3,682,673 | 8/1972 | Manske | 434/328 X |

FOREIGN PATENT DOCUMENTS 858194  1/1961  United Kingdom ............... 434/346

*Primary Examiner*—William H. Grieb
*Attorney, Agent, or Firm*—Daniel E. Kramer

[57] ABSTRACT

A scoring form for tests having a series of questions with multi-choice answers.

The form provides an answer group for each question. An answer group is a matrix of rows and columns. The number of columns (or matrix elements in a row) is typically equal to the number of answer choices in the questions, with the elements in each row identified the same as the answer choices. The number of rows in the matrix is equal to the position number of the question in the ordered series of test questions. Each line in the matrix is identified by the question number and one of a series of hyphenated identifiers.

Each element in each matrix contains a latent image address which is invisible to the testee until he activates the latent image, as by rubbing the spot which he associates with the correct answer. The image which becomes visible contains the identification for the line he is to use for entering the answer to the next question and carries with it by inference the information about the correctness of his answer to the last and all prior questions.

Each line in a given matrix is keyed by the test maker to the number of prior questions answered correctly. The matrix of the last question will have each matrix element contain the actual score or a letter or symbol which the testee will note and which the test administrator can interpret, giving the testee his score after he has returned the test.

10 Claims, 9 Drawing Figures

QUESTION 1

| | a | b | c | d | e |
|---|---|---|---|---|---|
| 1-1 | | | | | 2-1 |

QUESTION 2

| | a | b | c | d | e |
|---|---|---|---|---|---|
| 2-1 | | | | | 3-2 |
| 2-2 | | | | | |

QUESTION 3

| | a | b | c | d | e |
|---|---|---|---|---|---|
| 3-1 | | | | | |
| 3-2 | | 4-1 | | | |
| 3-3 | | | | | |

QUESTION 4

| | a | b | c | d | e |
|---|---|---|---|---|---|
| 4-1 | | | | 3 | |
| 4-2 | | | | | |
| 4-3 | | | | | |
| 4-4 | | | | | |

FIGURE 1

QUESTION 1

| | a | b | c | d | e |
|---|---|---|---|---|---|
| 1-1 | | | | | |

QUESTION 2

| | a | b | c | d | e |
|---|---|---|---|---|---|
| 2-1 | | | | | |
| 2-2 | | | | | |

QUESTION 3

| | a | b | c | d | e |
|---|---|---|---|---|---|
| 3-1 | | | | | |
| 3-2 | | | | | |
| 3-3 | | | | | |

QUESTION 4

| | a | b | c | d | e |
|---|---|---|---|---|---|
| 4-1 | | | | | |
| 4-2 | | | | | |
| 4-3 | | | | | |
| 4-4 | | | | | |

FIGURE 2

QUESTION 1

| | a | b | c | d | e |
|---|---|---|---|---|---|
| 1-1 | | | | | 2-1 |

QUESTION 2

| | a | b | c | d | e |
|---|---|---|---|---|---|
| 2-1 | | | | | 3-2 |
| 2-2 | | | | | |

QUESTION 3

| | a | b | c | d | e |
|---|---|---|---|---|---|
| 3-1 | | | | | |
| 3-2 | | 4-1 | | | |
| 3-3 | | | | | |

QUESTION 4

| | a | b | c | d | e |
|---|---|---|---|---|---|
| 4-1 | | | | 3 | |
| 4-2 | | | | | |
| 4-3 | | | | | |
| 4-4 | | | | | |

QUESTION 1

|  | a | b | c | d | e | TEST MAKERS NON DISCLOSED KEY |
|---|---|---|---|---|---|---|
| 1-1 | 2-1 | 2-1 | 2-2 | 2-1 | 2-1 | |

QUESTION 2

|  | a | b | c | d | e | |
|---|---|---|---|---|---|---|
| 2-1 | 3-3 | 3-3 | 3-3 | 3-3 | 3-2 | 0 RIGHT |
| 2-2 | 3-2 | 3-2 | 3-2 | 3-2 | 3-1 | 1 RIGHT |

QUESTION 3

|  | a | b | c | d | e | |
|---|---|---|---|---|---|---|
| 3-1 | 4-1 | 4-4 | 4-1 | 4-1 | 4-1 | 2 RIGHT |
| 3-2 | 4-3 | 4-1 | 4-3 | 4-3 | 4-3 | 1 RIGHT |
| 3-3 | 4-2 | 4-3 | 4-2 | 4-2 | 4-2 | 0 RIGHT |

QUESTION 4

|  | a | b | c | d | e | |
|---|---|---|---|---|---|---|
| 4-1 | 2 | 2 | 2 | 3 | 2 | 2 RIGHT + (1 OR 0) |
| 4-2 | 0 | 0 | 0 | 1 | 0 | 0 RIGHT + (1 OR 0) |
| 4-3 | 1 | 1 | 1 | 2 | 1 | 1 RIGHT + (1 OR 0) |
| 4-4 | 3 | 3 | 3 | 4 | 3 | 3 RIGHT + (1 OR 0) |

*FIGURE 3*

QUESTION 1

|  | a | b | c | d | e | |
|---|---|---|---|---|---|---|
| 1-1 | 2-3 | 2-1 | 2-2 | 2-1 | 2-1 | |

QUESTION 2

|  | a | b | c | d | e | |
|---|---|---|---|---|---|---|
| 2-1 | 3-3 | 3-4 | 3-3 | 3-3 | 3-2 | 0 RIGHT |
| 2-2 | 3-2 | 3-5 | 3-2 | 3-2 | 3-1 | 1 RIGHT |
| 2-3 | 3-3 | 3-4 | 3-3 | 3-3 | 3-2 | 0 RIGHT |

QUESTION 3

|  | a | b | c | d | e | |
|---|---|---|---|---|---|---|
| 3-1 | 4-5 | 4-4 | 4-1 | 4-1 | 4-1 | 2 RIGHT |
| 3-2 | 4-6 | 4-1 | 4-3 | 4-3 | 4-3 | 1 RIGHT |
| 3-3 | 4-7 | 4-3 | 4-2 | 4-2 | 4-2 | 0 RIGHT |
| 3-4 | 4-7 | 4-3 | 4-2 | 4-2 | 4-2 | 0 RIGHT |
| 3-5 | 4-6 | 4-1 | 4-3 | 4-3 | 4-3 | 1 RIGHT |

QUESTION 4

|  | a | b | c | d | e | |
|---|---|---|---|---|---|---|
| 4-1 | 2 | 2 | 2 | 3 | 2 | 2 RIGHT + (1 OR 0) |
| 4-2 | 0 | 0 | 0 | 1 | 0 | 0 RIGHT + (1 OR 0) |
| 4-3 | 1 | 1 | 1 | 2 | 1 | 1 RIGHT + (1 OR 0) |
| 4-4 | 3 | 3 | 3 | 4 | 3 | 3 RIGHT + (1 OR 0) |
| 4-5 | 2 | 2 | 2 | 3 | 2 | 2 RIGHT + (1 OR 0) |
| 4-6 | 1 | 1 | 1 | 2 | 1 | 1 RIGHT + (1 OR 0) |
| 4-7 | 0 | 0 | 0 | 1 | 0 | 0 RIGHT + (1 OR 0) |

*FIGURE 4*

QUESTION 4

| | a | b | c | d | e | |
|---|---|---|---|---|---|---|
| 4-1 | C | H | C | D | C | 2 RIGHT + (1 OR 0) |
| 4-2 | A | F | A | B | A | 0 RIGHT + (1 OR 0) |
| 4-3 | B | G | B | C | B | 1 RIGHT + (1 OR 0) |
| 4-4 | D | J | D | E | D | 3 RIGHT + (1 OR 0) |
| 4-5 | H | C | H | J | H | 2 RIGHT + (1 OR 0) |
| 4-6 | G | B | G | H | G | 1 RIGHT + (1 OR 0) |
| 4-7 | F | A | F | B | F | 0 RIGHT + (1 OR 0) |

*FIGURE 5*

QUESTION 1

| a | b | c | d | e |
|---|---|---|---|---|
|   |   |   |   |   |

QUESTION 2

| a | b | c | d | e |
|---|---|---|---|---|
|   |   |   |   |   |

QUESTION 3

| a | b | c | d | e |
|---|---|---|---|---|
|   |   |   |   |   |

QUESTION 4

| a | b | c | d | e |
|---|---|---|---|---|
|   |   |   |   |   |

*FIGURE 6*

QUESTION 1

| a | b | c | d | e |
|---|---|---|---|---|
| G | H | I | J | K |

QUESTION 2

| a | b | c | d | e |
|---|---|---|---|---|
| R | M | N | P | L |

QUESTION 3

| a | b | c | d | e |
|---|---|---|---|---|
| G | I | H | K | N |

QUESTION 4

| a | b | c | d | e |
|---|---|---|---|---|
| G | H | K | L | M |

*FIGURE 7*

SELF-SCORING TEST WITH NON-DISCLOSED KEY

BACKGROUND OF THE INVENTION

Field of the Invention

Schools and colleges who have more applicants than they have student capacity, desire to select from all the applicants, those who are most likely to succeed.

Associations or governmental agencies who wish to grant professional licenses or establish levels of expertise need to determine applicants' degree of knowledge of their specialty.

Employers, via Civil Service or otherwise, wish to promote those employees who can demonstrate the greatest competence in one or more job related subject areas.

All of these groups utilize multiple choice tests generated by testors to aid in the performance of their selection, licensing, granting awards, or promotion.

The testee reads each question, reads the alternative answers provided by the test maker, selects the one he believes is most nearly correct, notes the identifier associated with the answer and the question number and with a pencil or marker, places a mark on the answer sheet for the question number and at the identifier position corresponding to his answer choice. When all the questions have been answered or when the allotted time has elapsed, the testee turns in his question sheet and answer sheet and leaves the place of testing.

He then has agonized weeks, or even months, before his score is reported to him. In the meantime, he may be obligated to make decisions regarding his future actions, which he could have made better had he known his score at the end of the test. That is an interest of the testee.

By contrast, the interest of the testor is to retain the contents of the test questions and answers confidential. The testor wishes this confidentiality to reduce the cost of designing subsequent tests and to make all testees as nearly equal as possible by denying to all prior knowledge of the test questions and the answers and the logic on which the answers are based.

This invention is directed toward the satisfaction of both the interests of the testor and the testee.

The invention is directed to the mechanisms for testing intellectual capacity.

It is further directed toward tests having multiple questions, each one of which is of the multiple choice type: that is, of the type having a series of possible answers, one of these being best or most correct.

It is further directed toward answer sheets for these tests which, without disclosing the key, directly or indirectly inform the testee the score achieved at the conclusion of the test.

It is further directed toward answer sheets that use latent image techniques for directing the testee to scoring sites, the location of which depends on the correctness of his answers to the prior questions.

It is further directed to scoring sites which are integral with the answer matrix.

It is further directed to scoring sites which are external to the answer matrix.

Related Art

Applicant knows of no related art which shows or suggests the use of latent image techniques in multiple choice tests for the purpose of providing the testee with a score; without disclosing the key; and without providing a clue as to the correctness of any answer.

The self-scoring tests known before, which hide the key, require that there be a discoverable external key. This key may be in the form of an overlay, like a template; an "under lay" like a carbon paper, and an underlying sheet having outlined boxes positioned under the correct answer. Such devices are not only mechanically complex and therefore costly but also can disclose the key to anyone who gains unauthorized possession of a test. By contrast, my self-scoring answer form is complete in itself and need not disclose the key even to one who is in unauthorized possession.

BRIEF SUMMARY OF THE INVENTION

In a multiple choice test, a scoring form is used to allow the testee to record his answers. For short tests, the scoring form may be on the sheet containing the questions. On longer tests, the form is generally separate.

In my invention, the scoring form provides an answer matrix for each question. The answer matrix has at least as many lines as the serial number of the question (1 row for Question #1; 2 rows for Question #2; ... ). The answer matrix has as many columns as the test designer has provided answer choices for each question, usually five.

Each answer element within every answer matrix incorporates a latent image. This image becomes displayed when activated by the testee who has selected that element location as the correct answer to the associated question. The hidden information which is displayed on activation of the latent technique is the matrix location of the row of elements at which the testee will enter his answer to the next question. It is this matrix location that carries with it by inference the information as to the correctness or the incorrectness of the testee's answer to the prior question. All persons with a similar general level of success on prior questions are directed to the same matrix locations.

BRIEF DESCRIPTION OF DRAWINGS

FIG. 1 shows an answer sheet for a four-question test before any answers have been selected by a testee.

FIG. 2 shows an answer sheet for the same four question test where a testee has activated one latent element per question.

FIG. 3 shows the answer sheet for the same four question test, showing the entry in each element before it has been made latent.

FIG. 4 shows an answer sheet similar to FIG. 3 except 2N−1 lines have been provided in each answer matrix after the first; N being the number of the question/answer.

FIG. 5 shows the matrix for answer 4, having the same matrix construction as answer 4 in FIG. 4 but with latent score identifiers instead of numerical scores.

FIG. 6 shows another type of self-scoring answer sheet with non-disclosed key before the testee activates any element.

FIG. 7 shows the same answer sheet as in FIG. 6 showing the entry in each element before it has been made latent.

DETAILED DESCRIPTION OF THE INVENTION

Figures 8, 9:
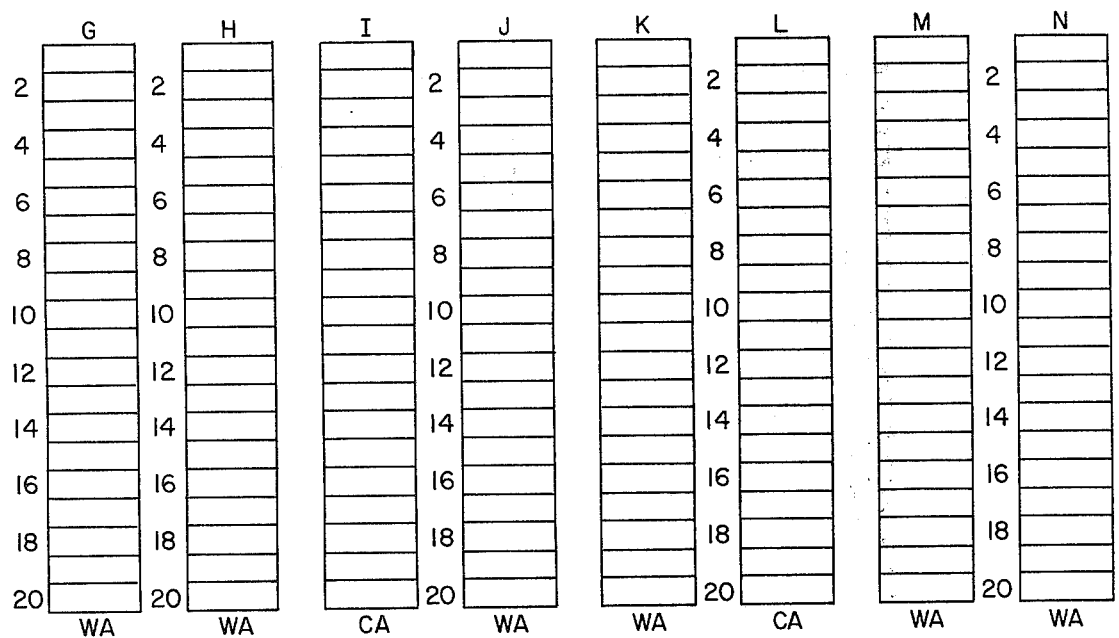
FIG. 8 shows the scoring sheet used optionally by that testee who wishes to know his score at the conclusion of the test.
FIG. 9 is a prelatent scoring sheet where the numbers direct the testee to a score-related position on the test sheet.

FIG. 1 is an outline of an answer sheet for Test #1. The answer sheet utilizes a latent image technology to hide the information provided in each box or element. There are many latent image technologies which are suited to use in this invention. The characteristics of the latent image technology that are most desired are:

(a) Freedom from cueing. Cueing is any physical manifestation of the latent image which improves the testee's chances of scoring correctly.

(b) Irreversibility. That characteristic of a latent image which makes its activation permanent.

Generally both these requirements can be met by latent systems involving the use of one of the following: water soluble dye activated by water pen; spirit duplication activated by chemical pen; xerography with over-lays activated by eraser or scraping, or with over-lays which respond with pressure to release a reactant which makes visible the latent information. The over-lays can be applied in a confusing format to further minimize cueing.

A review of latent image technology is set forth in U.S. Pat. No. 3,682,673, issued Aug. 8, 1972, to Wendell J. Manske. An example of erasable over-lays which provide invisibility to the hidden image by confusing format is given by U.S. Pat. No. 2,986,820, issued June 1, 1961, to Richard S. Neville and Arthur M. Malian. For the purposes of this specification, I have found the spirit duplication process available from A. B. Dick Co., 5700 West Touhy Ave., Chicago, Ill. most satisfactory.

Utilizing these techniques of latent imagery, the simplest way to tell a testee whether he has gotten a question right or wrong is simply to print the word "Right" in the box corresponding to the correct answer, and the word "Wrong" in the others. The testee would keep his own score. However, though such a technique is frequently used in tests which are of the so-called "self-teaching" type, it is my objective here to hide from the testee the correctness of his answer to preserve the integrity of the test yet provide coded information which carries with it by inference a summation of the correctness of the current and prior responses. I achieve this by providing an answer matrix. The matrix typically has the same number of horizontal positions or columns as there are possible answers to the question. The matrix in its simplest form has the same number of vertical positions or lines as the sequential number of the question/answer with which the matrix is associated. Each vertical position or line is identified at the left side by a hyphenated number. The first portion of the hyphenated number is the number of the question/answer. The second portion is the matrix position starting with one at the top and increasing by one for each successively lower line.

The test maker randomly assigns to each line a numerical value corresponding to the number of prior questions the testee has answered correctly. For example, the test maker establishes that matrix line 2-1 indicates that Question 1 was answered incorrectly, while matrix line 2-2 embodies the information that Question 1 was answered correctly.

The testee, when he answers Question 1, by selecting a matrix element at A, B, C, D, or E, activates the latent image at that element. This discloses to him the line position at which he must answer the answer for the next successive question. For instance, if, in Question 1, element C corresponded to the most nearly correct answer to the question set forth in Test #1, then the image concealed by the latent technique would direct the testee to line 2-2, which he would immediately circle prior to reading the second question.

FIG. 2 shows the answer sheet of FIG. 1 which has been used by a testee. The testee has answered question 1 incorrectly by selecting element E instead of element C, the correct answer. However, he has answered questions 2, 3, and 4 correctly. When he has activated the latent image at the correct position D on line 4-1 of question 4, the number 3 is disclosed, which informs the testee that he correctly answered three of the four questions. If, on line 4-1, the testee had instead of activating correct element D, activated incorrect A, B C or E, the number disclosed by the latent technology would have been 2.

In the alternative, the test maker could have provided in the last question a letter or other identifier instead of the actual numerical score. Here the test administrator would interpret this letter or symbol and tell the testee his score when the testee turned in his questions and answer sheet. (See FIG. 5 and Table 1)

FIG. 3 shows the answer sheet of FIGS. 1 and 2 with the information printed in each of the answer elements prior to the application of the latent imagery technique which would make the information disappear. To the right of the answer sheet of FIG. 3 is the evaluation by the test maker or administrator of the answer value of each line of each matrix. Naturally this information would not appear on the answer sheet.

The answer sheet developed in this manner can be converted to a conventional application. If there is no interest in knowing at the conclusion of the test the value of a final score, the testee can simply mark all the answers in the top line of the answer matrix for each question and ignore the number disclosed at the end. Naturally, different informational techniques for directing the testee to the appropriate answer line of the answer matrix for the next question can be used. Sequestial numbers or letters, or numbers and letters, or any other identifiers that will serve to simplify and make more certain the operation of the test are appropriate.

FIG. 4 is an answer/scoring sheet for the test of Test #1. It is similar to that of FIG. 3 because it utilizes a multi-line answer matrix and because all its entries are prelatent. Where FIG. 3 had N lines—N being equal to the question number—the answer sheet of FIG. 4 has 2N−1 lines. With the additional lines it is possible to have three different entries among the five elements in each line, so that a deliberate exposure of all the entries, as by one who has improperly secured the answer sheet, will not disclose the key.

For instance, in Question 1 of Test #1, C is the correct answer. Reference to FIG. 3 shows that a deliberate activation of all the latencies in Answer 1 would have disclosed the key since the entry under C, 2-2 is the only one different from the others.

By contrast, in FIG. 4, while the entry at (C) is still 2-2, the entry at (a) is 2-3, different from all the others, so that deliberate activation of all the latencies will not disclose the key.

Deliberate activation of all the latencies at the last question will disclose the key of that question. Toward the end of hiding the key even of the last question against deliberate exposure, the plan of FIG. 5 can be employed.

In FIG. 5 a pre-latent exhibition of the entries in the answer matrix of Question 4, which substitutes for the answer matrix of Question 4 of FIG. 4, no scores are given; instead, letter identifiers are shown when the latency is activated. When the testee turns in his test materials to the monitor, the monitor consults a score chart, as in Table 1, and from that chart translates the letter identifier into a test score.

TABLE 1

| Letter Code | Score |
|---|---|
| A | 0 |
| B | 1 |
| C | 2 |
| D | 3 |
| E | 4 |
| F | 0 |
| G | 1 |
| H | 2 |
| J | 3 |

FIG. 6 is an answer sheet for Test #1 which utilizes the same latent image technologies as the score sheet of FIG. 1. The answer sheet of FIG. 6, in contrast to the answer sheets of FIGS. 1 through 5, has only one row in each answer matrix with the number of elements in each row corresponding to the number of answer choices provided by the testor.

FIG. 7 shows the normally hidden data in each matrix element of the answer sheet of FIG. 6. In each line, each unit of data is different from every other. Therefore, an unauthorized person in possession of the answer sheet and who activated the latencies in all elements would gain no information about the correctness of any answer.

FIG. 8 shows the score sheet that is used with the answer sheet of FIG. 6. The number of columns (score accumulators) provided must be at least one greater and should be two or three greater than the number of answer choices.

Two or more columns ("CA") should be selected as responses for correct answers. One of these ("CA") column headings will be selected for the "correct answer" location in each answer matrix. The information in the remaining elements of each answer matrix will be selected from the group of "WA" (wrong answers) column headings such that no two of the data elements in the matrix elements are the same.

For the test of Test #1 and the answer sheets of FIGS. 6 and 7, the columns of the score sheet of FIG. 8, which must be added to secure the correct test score, are Columns I and L.

When the testee takes the test, for each question he activates an answer element. The latent data which is disclosed is a column heading on the score sheet. The testee simply puts a check under the disclosed column heading for each question. When he has completed the test and turned in his test materials, the administrator will advise him the column headings whose check counts must be added to secure his aggregate score.

FIG. 9 is an answer sheet employing latency principles for a test having the same subject matter as Test #1 but presented in form shown in Test #2. FIG. 9 shows the data in each answer element which would, in use, be hidden by the latency techniques.

The principle of the self-scoring system of Test #2 and FIG. 9 is that the revealed response in the answer sheet indirectly leads the testee to a score-related position on the answer sheet. It achieves this by revealing in the answer element selected by the testee the number of a question or the number of an instruction on the question sheet. If the revealed number is that of a question, the testee merely answers the question and makes his answer response using the latency technique in an answer element corresponding to the question number. If, however, the revealed number does not correspond to a question, then it corresponds to an instruction which has the following form: "Answer question__and enter the answer at number__."

When the testee reaches the last question, he will receive his score directly, as shown in FIG. 9, or he will be apprised of a code letter or symbol like that in Table 1 which the monitor can interpret as a score.

Employing these techniques, a testor can achieve his own objectives of key confidentiality while granting the testee his objective of immediate knowledge of the test score.

The score sheet of FIG. 1 can also be effectively used to provide "Formula Scoring;" Formula Scoring penalizes guessing by deducting a predetermined fraction of a point for each wrong answer but deducts nothing where the testee selects no answer. To use the score sheet of FIG. 1 for Formula Scoring purposes, the score sheet has to be modified to have one more element in the answer matrix than the number of answer choices in the question. Therefore, the score sheet of FIG. 1 would have to have six answer elements to serve test questions having five answer choices. The last answer element would be a "no choice" element. That is, it would be an element the testee would be directed to activate if he did not know which of the answer choices was correct and did not care to guess and risk a score penalty for an incorrect guess. Without the extra answer element for the "no choice" situation, the testee would have to guess, because without activating an answer element, he would not know at what row of answer elements to insert the answer to the next question.

The number of horizontal rows in the answer matrix must be greater for formula scoring than for non-formula scoring. That is because the information which must be carried forward from answer to answer for formula scoring includes both the number of questions answered correctly and the number answered incorrectly. The number of "no-choice" answers need not be carried forward since they have no positive or negative effect on the score. However, an answer element identified as "no choice" must be provided for each question.

Therefore the answer matrix for question 2 describing the results the testee achieved by his answer to question 1 would have to have 3 horizontal rows of answer elements, implying the following information:

| Question 2 |
|---|
| 0 Right |
| 1 Right |
| 1 Wrong |

For Question 4 there would have to be an answer matrix describing the aggregate results the testee achieved on Questions 1, 2 and 3. For this purpose, the matrix would have 10 horizontal rows having the following significance:

| |
|---|
| 3 Right |
| 2 Right, 1 Wrong |
| 2 Right |
| 1 Right, 2 Wrong |
| 1 Right, 1 Wrong |
| 1 Right |
| 0 Right, 3 Wrong |
| 0 Right, 2 Wrong |
| 0 Right, 1 Wrong |
| 0 Right |

The answer matrix for Question N describing the aggregate score for the prior Questions 1 through N−1 will require $(N^2-N)/2$ horizontal rows to convey all possible results for those preceding questions.

If Question 4 was the last question, the score disclosed on activation of an answer element would be the value of the number right less the aggregate penalty for all the questions answered incorrectly, but with no penalty for the questions where the "no choice" element was activated.

The answer matrix for Question 4 is set forth below with aggregate scores inserted on the following scoring basis:

| | | Score |
|---|---|---|
| Question Answered Correctly | | +1 |
| Question Answered Incorrectly | | −.5 |
| "No Answer" Selected | | 0 |

| | Question 4 | | |
|---|---|---|---|
| Success History, for Questions 1, 2, 3 | Question 4 Answered Correctly | Question 4 Answered Incorrectly | No Answer Selected for Question 4 |
| 3 Right | 4 | 2.5 | 3 |
| 2 Right, 1 Wrong | 3.5 | 2.0 | 2.5 |
| 2 Right | 3 | 1.5 | 2 |
| 1 Right, 2 Wrong | 1 | −.5 | 0 |
| 1 Right, 1 Wrong | 1.5 | 0 | .5 |
| 1 Right | 2 | .5 | 1 |
| 0 Right, 3 Wrong | −.5 | −2 | −1.5 |
| 0 Right, 2 Wrong | 0 | −1.5 | −1.0 |
| 0 Right, 1 Wrong | +.5 | −1 | −.5 |
| 0 Right | 1 | −.5 | 0 |

It is apparent that many modifications and variations of this invention as here and before set forth may be made without departing from the spirit and scope thereof. The specific embodiments described are given by way of example only and it is my intent that the scope of the invention be limited only by the terms of the claims.

TEST #1

SAMPLE LATENT IMAGE TEST

VERBAL OPPOSITES

1. VAGUE
   a. Massive
   b. Ornate
   c. Clear
   d. Furious
   e. Tame
2. AMBIGUOUS
   a. Mammoth
   b. Rococo
   c. Irritated
   d. Well-bred
   e. Unequivocal
3. NEBULOUS
   a. Large
   b. Defined
   c. Showy
   d. Irate
   e. Courteous
4. ABSTRUSE
   a. Huge
   b. Colorful
   c. Irascible
   d. Unambiguous
   e. Trained

TEST #2

SAMPLE LATENT IMAGE TEST

VERBAL OPPOSITES

1. VAGUE
   a. Clear
   b. Massive
   c. Ornate
   d. Furious
   e. Tame
2. (Use Question 3 but answer at 2)
3. AMBIGUOUS
   a. Unequivocal
   b. Mammoth
   c. Rococo
   d. Irritated
   e. Well-bred P0 4. (Use Question 5 but answer at 4) 5.
5. NEBULOUS
   a. Defined
   b. Large
   c. Showy
   d. Irate
   e. Courteous
6. (Use Question 5 but answer at 6)
7. (Use Question 9 but answer at 7)
8. (Use Question 9 but answer at 8)
9. ABSTRUSE
   a. Understandable
   b. Elephantine
   c. Flamboyant
   d. Angry
   e. Domesticated
10. (Use Question 9 but answer at 10)
11. (Use Question 9 but answer at 11)
12. (Use Question 9 but answer at 12)

I claim:

1. A self-scoring answer sheet for a test for investigating the intellectual capacity of a testee, said test having at least two questions, serially identified; each question having at least one correct answer choice and at least one incorrect answer choice, said answer sheet comprising:

a. Answer elements formed into one answer matrix for each question—said answer matrix having a first number of lines of elements and a second number of columns of elements, said first number being equal to or greater than the serial identifier of the question, said second number being equal to or greater than the number of answer choices provided in the question;

b. An identifier for each matrix corresponding to the serial identification of the question associated therewith;

c. Identifiers for each column of elements corresponding to the identifiers assigned to the answer choices;

d. Identifiers for each line of elements;
e. Identifiers positioned in each matrix element and hidden by a latent image technology, subject to exposure by said testee.

2. An answer sheet as in claim 1 where the hidden identifiers are keyed to the correctness of the related answer choice.

3. An answer sheet as in claim 1 having one more column of answer elements than the questions have answer choices and where the answer elements in the additional column are keyed to a choice by the testee not to answer the question.

4. An answer sheet as in claim 2 where each hidden identifier is related to an identified line in the next successive answer matrix.

5. An answer sheet as in claim 4 where each matrix line has an associated scoring value.

6. An answer sheet as in claim 4 where the scoring value is decreased by the selection by the testee of each incorrect answer choice.

7. An answer sheet as in claim 5 where the matrix associated with the last question of the test includes identifiers related to the score.

8. An answer sheet as in claim 7 where said identifiers are the score.

9. An answer sheet as in claim 5 where said first number of lines of elements is greater than the serial number of the question.

10. An answer sheet as in claim 9 where each line contains at least three different identifiers.

* * * * *